US 7,191,720 B2

(12) United States Patent
Thomas

(10) Patent No.: US 7,191,720 B2
(45) Date of Patent: Mar. 20, 2007

(54) METHOD OF MANUFACTURE FOR STITCHLESS GARMENT

(75) Inventor: David Thomas, Pfafftown, NC (US)

(73) Assignee: HBI Branded Apparel Enterprises, LLC, Winston-Salem, NC (US)

( * ) Notice: Subject to any disclaimer, the term of this patent is extended or adjusted under 35 U.S.C. 154(b) by 531 days.

(21) Appl. No.: 10/357,121

(22) Filed: Feb. 3, 2003

(65) Prior Publication Data

US 2004/0151864 A1 Aug. 5, 2004

(51) Int. Cl.
*D05B 23/00* (2006.01)
*D05B 17/00* (2006.01)

(52) U.S. Cl. .................... 112/475.09; 156/91
(58) Field of Classification Search ........... 112/475.09; 2/274, 275, 269, 46, 227, 69, 73; 156/88, 156/91; 428/192, 193, 194, 57, 111; 28/153, 28/155; 24/432; 66/172 E
See application file for complete search history.

(56) References Cited

U.S. PATENT DOCUMENTS

| 1,935,612 | A | | 11/1933 | Brady ............................. 150/1 |
|---|---|---|---|---|
| 2,264,224 | A | | 11/1941 | Swan ............................. 154/2 |
| 2,435,509 | A | * | 2/1948 | Pfeffer, Jr., et al. ............. 2/131 |
| 3,026,225 | A | * | 3/1962 | Ostby, Jr. .................... 428/57 |
| 3,168,749 | A | * | 2/1965 | Cala ............................. 2/269 |
| 3,333,280 | A | | 8/1967 | Hynek et al. ................... 2/143 |
| 3,823,445 | A | * | 7/1974 | Rivers ......................... 24/432 |
| 3,873,403 | A | * | 3/1975 | Edelman .................... 428/111 |
| 3,874,963 | A | * | 4/1975 | Barger ....................... 156/73.2 |
| 4,372,998 | A | * | 2/1983 | Shimada .................... 428/193 |
| 4,506,615 | A | | 3/1985 | Bächtiger ................ 112/262.1 |
| 4,508,582 | A | | 4/1985 | Fink ............................. 156/93 |
| 4,604,152 | A | | 8/1986 | Liukko ........................ 156/93 |
| 4,670,908 | A | | 6/1987 | Albert ........................... 2/139 |
| 4,793,034 | A | * | 12/1988 | Poloff et al. .................. 28/153 |
| 5,003,902 | A | | 4/1991 | Benstock et al. ........... 112/418 |
| 5,568,779 | A | | 10/1996 | Wong ......................... 112/441 |
| 5,586,339 | A | * | 12/1996 | Lathan ........................... 2/46 |
| 5,590,615 | A | | 1/1997 | Wong ......................... 112/441 |
| 5,713,292 | A | | 2/1998 | Wong ......................... 112/441 |
| 5,775,394 | A | | 7/1998 | Wong ......................... 112/441 |

(Continued)

FOREIGN PATENT DOCUMENTS

DE        3540022        5/1987

OTHER PUBLICATIONS

Bemis, "*Sewfree: Adhesive Film for Seamless Apparel Construction*", Sewfree.com.

*Primary Examiner*—Ismael Izaguirre
(74) *Attorney, Agent, or Firm*—Ohlandt, Greeley, Ruggiero & Perle, L.L.P.

(57) ABSTRACT

A stitchless garment and a method of making the stitchless garment are provided. The method is used in connection with manufacturing a circular knit garment using a first garment component and a second garment component. The method includes the steps of providing the first garment component and providing the second garment component so that the second garment component overlaps the first garment component to define a connection. A bonding tape is provided at the connection. Heat is applied to the first garment component and the second garment component. The method also includes the step of applying pressure to the bonding tape to adhere the first garment component to the second garment component to provide a stitchless garment.

18 Claims, 2 Drawing Sheets

U.S. PATENT DOCUMENTS

| | | | |
|---|---|---|---|
| 5,782,191 A | 7/1998 | Wong | 114/441 |
| 5,950,554 A | 9/1999 | Wong | 112/475.09 |
| 6,070,542 A | 6/2000 | Wong | 112/475.09 |
| 6,079,343 A | 6/2000 | Wong | 112/475.09 |
| 6,105,171 A | 8/2000 | Niedermeyer | 2/114 |
| 6,192,521 B1 * | 2/2001 | Alberts et al. | 2/227 |
| 6,240,563 B1 | 6/2001 | Niedermeyer | 2/114 |
| 6,286,144 B1 * | 9/2001 | Henderson et al. | 2/69 |
| 6,287,168 B1 | 9/2001 | Rabinowicz | 450/75 |
| 6,471,803 B1 * | 10/2002 | Pelland et al. | 156/64 |
| 6,622,312 B2 | 9/2003 | Rabinowicz | 2/401 |
| 6,797,352 B2 * | 9/2004 | Fowler | 428/57 |
| 6,817,034 B2 * | 11/2004 | Smilovic | 2/73 |

* cited by examiner

METHOD OF MANUFACTURE FOR STITCHLESS GARMENT

BACKGROUND OF THE INVENTION

1. Field of the Invention

The present invention relates to a stitchless garment and a method of manufacture of the same. More particularly, the present invention relates to a method of manufacturing a circular knit garment that eliminates a stitching operation where two garment components are fastened or joined to one another.

2. Description of the Prior Art

Traditionally, general every day wearable garments are manufactured using cut-and-sew sections of fabric. The fabric is connected to one another to form a completed clothing article by stitching. The garment or article of clothing is joined or fastened together in the prior art by a threaded needle. The threaded needle arranges an array of threads in sewing, knitting, crocheting or any other suitable manner between predetermined garment components. The predetermined garment components are tightly fastened or joined to one another by these stitches.

In the area of seamless circular knitting technology, garments are produced in a substantially seamless manner. However, there still remains several operations where stitching is required in order to complete the finished article for sale. These stitching operations are laborious and costly and detract from the typically highly productive seamless circular knit manufacturing process.

Seamless circular knitting articles are usually hosiery, lingerie and innerwear. Garments that are circular knit typically lack a physical support structure relative to prior art articles of clothing. This lack of support structure allows for a user to more comfortably move in the seamless article of clothing. However, although the lack of support structure aids in a more comfortable clothing article, any stitching may tend to make the clothing article uncomfortable.

Stitching, although useful in certain circumstances, typically may have unintended and detrimental consequences with seamless circular knit articles. Stitching may cause the inner surface of the garment to become uncomfortable when contacting the skin and body tissues of the user. Stitches that are in contact with the user's skin in active wear and in support type garments may lead to inflammation, irritation bruises and chafes. Inflammation, irritation bruises and chafes may occur at the point of contact of the skin with the seam, or the similar line, ridge, or groove made by fitting, joining, or lapping together two garment components along their edges.

Typically, seams with stitches are rough and compress skin and body tissues. Also, stitches generally are made of a fabric or a material that has a different modulus of elasticity than the remainder of the garment. In addition, seams with stitches may have different stretch properties that cause the seams, unlike the remainder of the garment to restrict athletic movement. In particular, while a front panel and a rear panel of an article of clothing may move and be flexible to movement, the stitch and the seam may resist or otherwise restrict that movement causing the article of clothing to be uncomfortable.

This is especially prevalent in the instance where there exists an enlarged surface area of the seams. The attendant friction resulting between the interaction of the stitches on the seams and the user's skin and body tissues between the inner surface of the garment and the skin of the user results in a detrimental restrictive experience for the user. In the instance of manufacturing a considerable number of articles of clothing, stitching may increase the overall manufacturing costs of the garment and increase the time, and labor costs of manufacturing an individual article of clothing.

What is desired in the art is a method of attaching a first garment component and a second garment component to one another by an adhesive. Several methods of adhering a predetermined garment component to another garment component have been disclosed in the art. For instance, U.S. Pat. No. 5,590,615 to Wong discloses a pucker free garment seam. Wong teaches a method of providing a bonding element and at least a thermally adhesive component. The bonding element is placed along a seam. The seam is formed by positioning a first garment component and the second garment component such that the lower surface of the bonding element contacts the seam at an upper surface of the first garment component. A first set stitch is placed along a side of the seam and then the first garment component is folded over the bonding element to glue and stitch the garment components together and create a pucker free seam.

Although, Wong introduces a bonding element and thermal adhesive, the bonding does not obviate the necessity of stitching the garment. Undoubtedly the garment will remain uncomfortable at the point of contact between the user's body tissues and the set stitch. The stitching will undeniably contact the skin of the user. When engaging in activities, the stitches placed along the side of the seam may cause inflammation, irritation, bruises and chafes at the point of contact of the seams, especially in the instance of active wear and seamless garments.

A flexible article made from a garment having a certain predetermined modulus of elasticity and stretchiness will be reduced to a relatively stiffer garment by adhering, folding over and stitching the respective garment components together. Wong teaches that adhering, folding over and stitching all will undoubtedly reduce or diminish the overall stretchiness of the garment. By placing an adhesive component between any first and second garment components, the overall elasticity of the completed article is reduced. By reverse folding a garment component over the adhesive elasticity is again further reduced.

The prior art is lacking an effective method for fastening a first garment component and a second garment component together using a bonding element that does not reduce the amount of elasticity of the garment. By utilizing an improved seaming method, rather than using uncomfortable seams, improved comfort characteristics and flexibility characteristics can be achieved, while maintaining the necessary structure to allow the user to wear an improved garment with suitable support for engaging in athletic activities.

Thus, it is desirable to provide a method of seaming that has an improved functionality having an elastic adhesive bonding element that enables the manufacturer to more precisely and productively produce an elastic, comfortable and non-irritating garment in a cost effective manner.

SUMMARY OF THE INVENTION

It is an object of the present invention to provide a garment that is manufactured without stitching.

It is another object of the present invention to provide a garment that is circular knit having a first seamless garment component and a second seamless garment component that are connected by a bonding tape.

It is yet another object of the present invention to provide a garment for active wear that does not have stitches to irritate or chafe the user's skin.

It is still another object of the present invention to provide a garment that has a seaming method that allows for flexibility between the first garment component, the second garment component and a bonding tape.

It is a further object of the present invention to provide a garment having bonding tape that is elastic.

These and other objects and advantages of the present invention are achieved by providing a seamless garment made from at least a first garment component and a second garment component, where each component may be a circular knit garment component. The second garment component overlaps the first garment component to define a connection. A bonding tape is disposed at the connection, and thus between the first and second garment component. An upper surface of the bonding tape contacts a lower surface of the first garment component, and a lower surface of the bonding tape contacts an upper surface of the second garment component. In addition, the upper surface of the first garment component is heated, preferably by a heated foot, and the lower surface of the second garment component is also heated, preferably by a heated plate. Pressure is applied to the bonding element to adhere the first garment component to the second garment component to provide a garment without stitching.

DESCRIPTION OF THE DRAWINGS

The above and other objects, advantages and benefits of the present invention will be understood by reference to the detailed description provided below and the accompanying drawings.

DETAILED DESCRIPTION OF THE INVENTION

Figure 1:
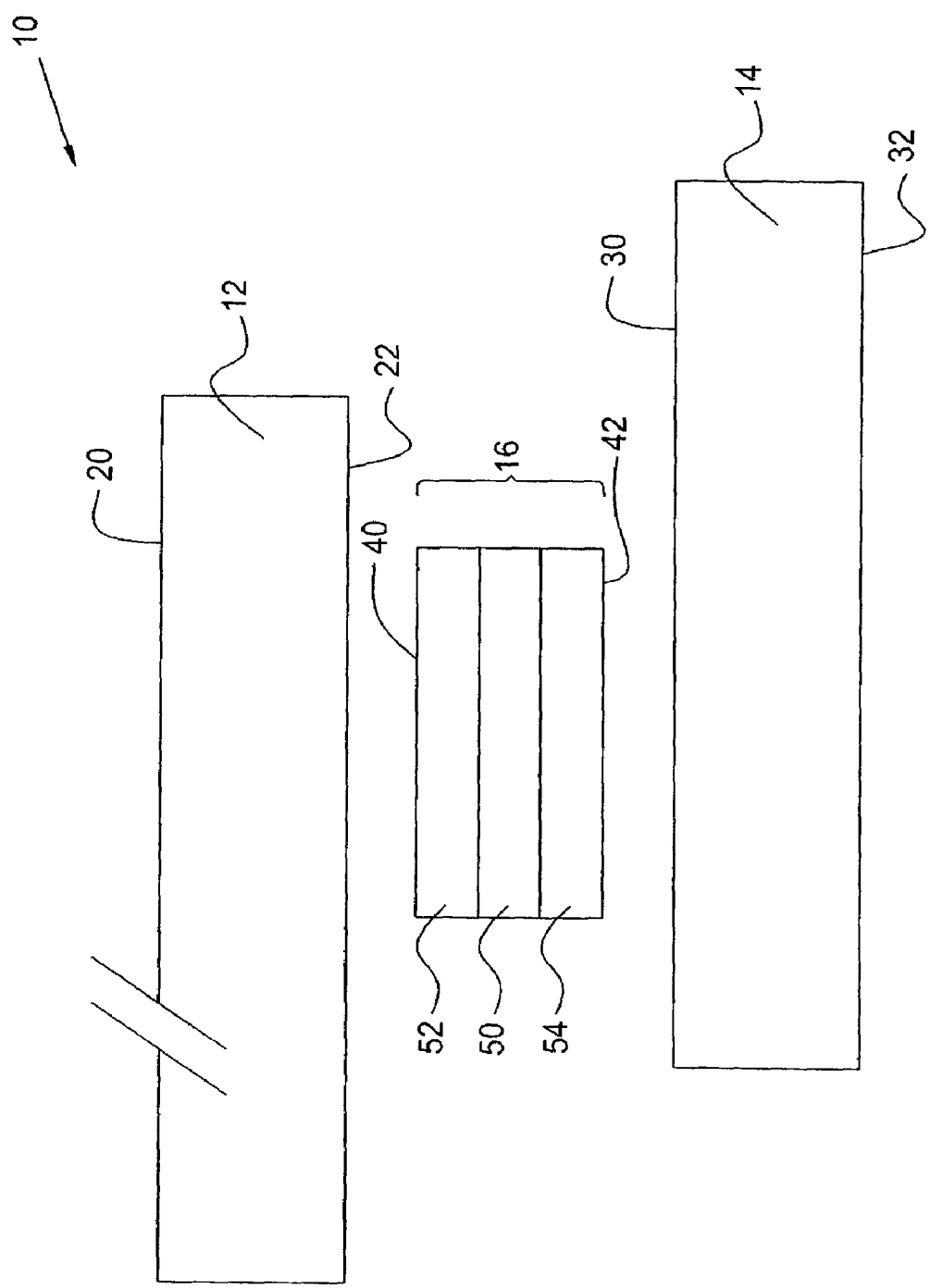
FIG. 1 is a perspective view of an improved seaming method of the present invention.

Referring to the drawings and in particular FIG. 1, there is provided a substantially stitchless garment in accordance with a preferred embodiment of the present invention generally represented by reference numeral 10. The garment 10 has a first garment component 12, a second garment component 14 and a bonding component or bonding tape 16 adapted to be positioned between the first and the second garment components.

Although the specific embodiment shown is directed to a seam for an armhole of a shirt to a sleeve, the method for stitchlessly attaching a sleeve to a shirt of the present invention may be used for a variety of seams in a variety of garments. For example, the method can be used to create seams in a center placket, collar, cuff, front panel, yoke, rear panel, shirt sleeve, bra, breast cup, gusset panel, strap, center gore, as well as various seams of a short, dress, night gown and/or trouser.

The first garment component 12 and second garment component 14 have a seamless structure, that is more preferably a knit structure, that makes the first garment component and the second garment component resiliently stretchable in both the vertical and horizontal direction.

The first garment component 12 and second garment component 14 can be knit, for example, from various types of face yarns or back yarns depending on the desired properties of the fabric, and the face or back yarns can be various deniers. The fabric for first garment component 12 and second garment component 14 may be selected from desired characteristics of the fabric such as the hand appearance, texture and activities that the finished product is intended to be used in. The desired fabrics include, but are not limited to, nylon, textured nylon, spandex or elastomeric, polyester, or any combinations thereof. In a preferred embodiment of the present invention, the first and second garment components 12, 14 may be a combination of elastomeric and a textured nylon to impart resiliency to the finished product.

An integral part of the present invention is that the connection between first garment component 12 and second garment component 14 is performed by bonding tape 16. The bonding tape 16 is positioned between first garment component 12 and second garment component 14 with no folding of either component. The resultant structure that uses bonding tape 16 in this manner provides a simple, cost effective, and perhaps less bulky structure as compared to conventional stitching. The bonding tape 16 preferably also acts to secure a knit edge and keeps first garment component 12 and second garment component 14 from raveling.

In a preferred embodiment of the present invention, bonding tape 16 may have an elasticity that is substantially similar to an elasticity property of first garment component 12 and second garment components 14 in order to maintain the overall elasticity and resiliency of the finished article. Bonding tape 16 may also be transparent, clear or semi-transparent, and is applied subsequent to any dying or staining of the first garment component 12, the second garment component 14, or any combinations thereof.

In a preferred embodiment of the present invention, the bonding tape 16 may be formed as a one, two, three or any number of suitable layer construction to maintain overall comfort and overall elasticity of the bonding tape while having an adhesive thereon. In the three layer embodiment of bonding tape 16, the bonding tape preferably includes an elastic component 50 sandwiched between a first adhesive layer 52 and a second adhesive layer 54. The first and second adhesive layers 52, 54 are integral with or applied to elastic component 50. This embodiment of bonding tape 16 has an overall diminutive width so as not to cause friction during for example, jogging, running or during active wear.

The elastic component 50 may be a urethane, spandex, nylon or any other suitable elastomeric material that will stretch with first garment component 12 and second garment component 14. Preferably, the elastic component 50 is a urethane.

The first adhesive layer 52 and second adhesive layer 54 can be made of any suitable adhesive material, preferably a thermoplastic adhesive that has a resistance to heat so as not to separate during laundering, but will adhere, even during laundering, first garment component 12 to second garment component 14. Such suitable adhesive materials may be polyurethane, polyamide, olefin, ethylene vinyl acetate, or any combinations thereof. Preferably, the first adhesive layer 52 and the second adhesive layer 54 are polyurethane.

Preferably, bonding tape 16 that includes elastic component 50 and first and second adhesive layers 52, 54, is a single tape. Such a single tape may be of the type commercially sold by Bemis Associates UK® or Bemis Manufacturing Company located in Shirley, Mass. under the designations 3410. This tape is primarily a polyurethane tape. It has a modulus in the range of about 54 gms to about 66 gms, preferably about 60 gms (0.13 lbs.) This bonding tape 16 has a softening point of about 120 degrees Celsius (248 degrees Fahrenheit).

Preferably, bonding tape 16 may be wound on a reel for use in a seaming or modified sewing machine. Once wound on a reel, bonding tape 16 may be fed by the seaming machine between first and second garment components 12, 14 such that top surface 40 of bonding tape 16 contacts bottom surface 22 of first component 12. Also, bottom surface 42 of bonding tape 16 contacts top surface 30 of second garment component 14. Thereafter, upper surface 20 of first garment component 12 is heated, preferably by a heated plate (not shown), and lower surface 32 of second garment component 14 is heated, preferably by a heated foot (not shown).

The heated plate and the heated foot raise the temperature of bonding tape 16, and in particular first adhesive layer 52 and second adhesive layer 54, while not damaging elastic component 50 and not diminishing the elasticity of the elastic component. The heated foot is placed on an outer surface of first garment component 12. The heated foot heats, preferably the outer surface of first garment component 12, thereby heating bonding tape 16 to bond first garment component 12 to second garment component 14. In this manner, bonding tape 16 adheres first garment component 12 to second garment component 14. Thus, first garment component 12 can be a shirt sleeve, and second garment component 14 can be a torso-encircling portion of a garment so that bonding tape 16 will adhere the shirt sleeve to the torso-encircling portion of the garment.

In a preferred embodiment, a heated foot is disposed on the opposite side of a heated plate. The heated plate heats an inner surface of second garment component 14 and acts to press first garment component 12 and second garment component together. In another preferred embodiment of the present invention, pressure is preferably applied to move first adhesive layer 52 and the second adhesive layer 54 into the surface of the desired knit material. Pressure is applied on opposite sides of first garment component 12, second garment component 14 for adhering the respective portions of garment 100 together.

During heating, first adhesive layer 52 and second adhesive layer 54 flow into first and second garment components 12, 14. Thus, an advantageously strong fastening is created between first garment component 12 and second garment component 14, yet the fastening is achieved with a relatively diminutive width. Accordingly, the garment is more comfortable to the user. Also, bonding tape 16 is substantially unnoticeable to the user during wear. The bonding tape 16 preferably also acts to limit or otherwise minimize any unraveling of the first garment component 12, the second garment component 14, or any combinations thereof.

Figure 2:
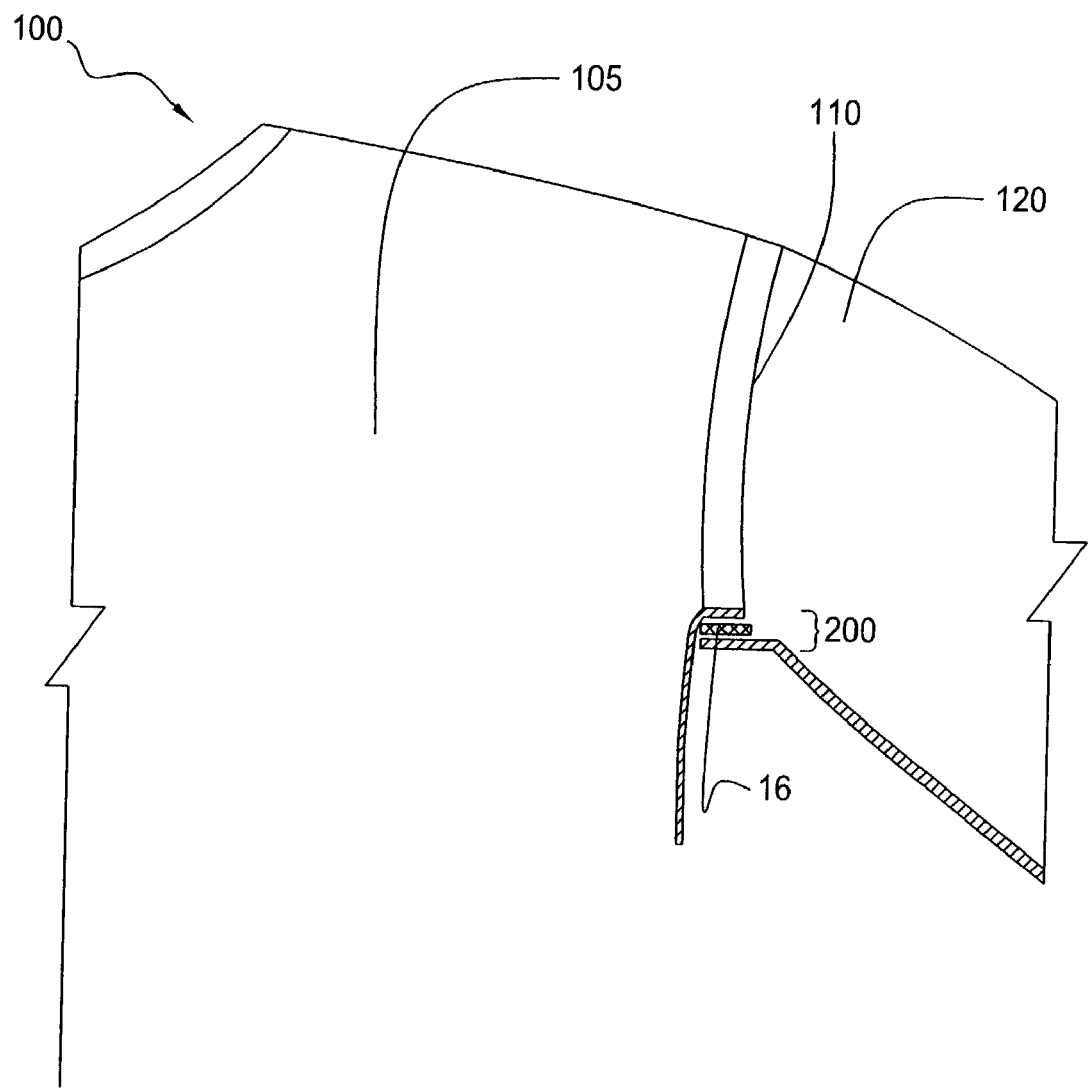
FIG. 2 is a cross-sectional view of an article of clothing using the improved seaming method of FIG. 1.

Referring to again to FIG. 2, a clothing article or garment 100 having an armhole seam is shown. The article 100 may be a seamless shirt, preferably a circular knit seamless shirt, having a torso-encircling portion 105 with a first armhole 110, and a first sleeve 120. The first sleeve 120 and torso-encircling portion 105 are placed to form a connection at the first armhole 110. This connection defines a first seam 200. The bonding tape 16 is provided at the first seam 200, and is properly aligned, preferably by feeding the bonding tape into a first seam 200, preferably by a seaming machine. Thereafter, the pressing operation is conducted using the heated foot and heated plate, discussed above. The first sleeve 120 and torso-encircling portion 105 are heated. Heat and pressure are applied to first seam 200 to adhere torso-encircling portion 105 to sleeve 120.

It should be understood that the foregoing description is only illustrative of the present invention. Various alternatives and modifications can be devised by those skilled in the art without departing from the present invention. Accordingly, the present invention is intended to embrace all such alternatives, modifications and variances.

What is claimed is:

1. A method of seamlessly manufacturing a circular knit garment between a first garment component and a second garment component comprising the steps of:
   laying the second garment component over a portion of the first garment component to define a connection;
   providing a bonding tape at said connection;
   heating the first and the second garment components;
   applying heat and pressure to said bonding tape to adhere the first garment component to the second garment component to provide a stitchless garment,
   wherein said bonding tape has an elastic component, and wherein said bonding tape has at least two layers of adhesive with each positioned on a different side of said elastic component.

2. The method of claim 1, wherein said at least two layers of adhesive is made of a thermal adhesive.

3. The method of claim 1, wherein said elastic component is made of a polyurethane.

4. The method of claim 1, wherein said bonding tape further comprises an elastic component disposed between at least two adhesive layers, said elastic component being selected from the group consisting of a polyurethane, nylon, spandex, and any combinations thereof.

5. The method of claim 4, wherein said at least two adhesive layers is selected from the group consisting of a polyurethane, polyamide, olefin, ethylene vinyl acetate, and any combinations thereof.

6. The method of claim 1, wherein the step of applying heat and pressure is accomplished by ironing.

7. The method of claim 1, wherein the first garment component and the second garment component are made of a material selected from the group consisting of a textured nylon, a nylon, a spandex, polyester, and any combinations thereof.

8. A method of manufacturing a stitchless article comprising:
   circular knitting a first series of courses to form a first tubular structure having opposite lateral sides each with armhole;
   circular knitting a second series of courses to form a second structure;
   feeding a bonding tape between said first and second structures;
   heating said bonding tape to adhere said first and second structures together to form the stitchless article.

9. The method of claim 8, wherein said first tubular structure has a first edge and a second edge, wherein the method further comprises the steps of feeding said bonding tape between said first edge and said second edge on opposite sides of a neck hole of said second structure, and heating said first edge, said second edge and said bonding tape such that said bonding tape adheres said first edge and said second edge together to form said neck hole of said second structure.

10. The method of claim 8, wherein the step of heating said bonding tape is performed by a heated foot and a heated plate disposed on opposite sides of said bonding tape.

11. The method of claim 10, wherein said second structure is a torso-encircling garment.

12. The method of claim 10, wherein said bonding tape has at least two layers of adhesive with each positioned on a different side of said elastic component.

13. A garment comprising:
   a first garment component;

a second garment component;

a bonding tape having an intermediate layer and at least two layers of adhesive, with each adhesive layer disposed on a different side of said intermediate layer, said bonding tape being disposed between said first garment component and said second garment component, wherein said first garment component is joined to said second garment component by heating said one or more layers of adhesive so that neither of said first and second garment components have a fold where joined together.

14. The garment of claim 13, wherein said at least two layers of adhesive is made of a thermal adhesive.

15. The garment of claim 14, wherein said at least two adhesive layers are selected from a material selected from the group consisting of a polyurethane, polyamide, olefin, ethylene vinyl acetate, and any combinations thereof.

16. A garment comprising:

a first garment component;

a second garment component;

a bonding tape having an intermediate layer and at least two layers of adhesive, with each adhesive layer disposed on a different side of said intermediate layer, said bonding tape being disposed between said first garment component and said second garment component, wherein said first garment component is joined to said second garment component by heating said one or more layers of adhesive so that said first and second garment components do not have a fold where joined together, wherein said intermediate layer has an elastic component.

17. The garment of claim 16, wherein said elastic component is made of polyurethane.

18. The garment of claim 16, wherein said elastic component is a material selected from the group consisting of a polyurethane, nylon, spandex, and any combinations thereof.

* * * * *